May 18, 1948.  C. U. GRAMELSPACHER  2,441,699
APPARATUS FOR MOLDING WOOD VENEER
Filed Nov. 18, 1942  3 Sheets-Sheet 1

INVENTOR
CLARENCE U. GRAMELSPACHER,
BY
*Toulmin & Toulmin*
ATTORNEYS

May 18, 1948.  C. U. GRAMELSPACHER  2,441,699
APPARATUS FOR MOLDING WOOD VENEER
Filed Nov. 18, 1942   3 Sheets-Sheet 2

INVENTOR
CLARENCE U. GRAMELSPACHER,
BY
Toulmin & Toulmin
ATTORNEYS

May 18, 1948.  C. U. GRAMELSPACHER  2,441,699
APPARATUS FOR MOLDING WOOD VENEER
Filed Nov. 18, 1942   3 Sheets-Sheet 3
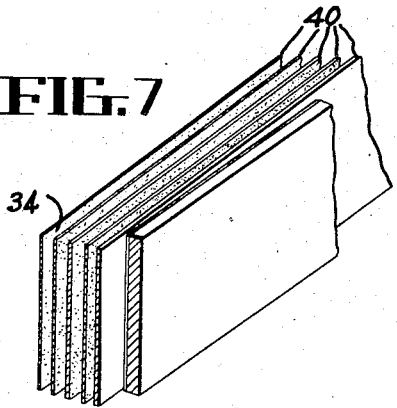
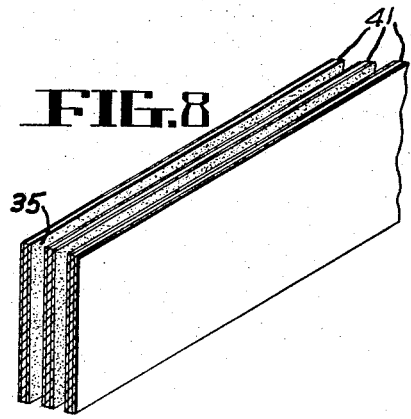
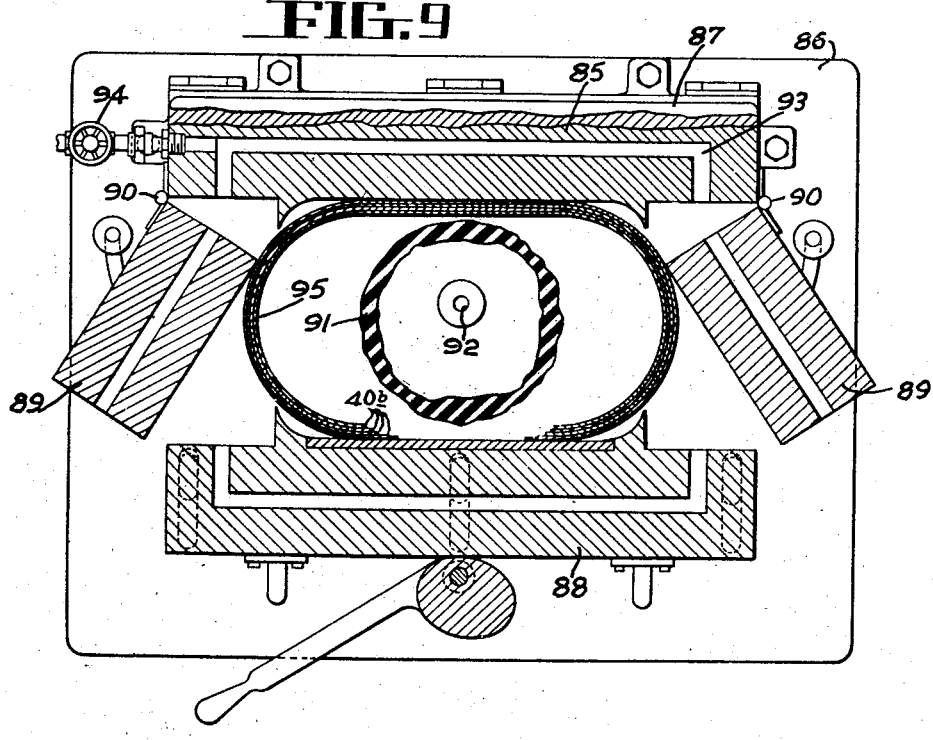
INVENTOR
CLARENCE U. GRAMELSPACHER,
BY
Toulmin & Toulmin
ATTORNEYS Patented May 18, 1948

2,441,699

UNITED STATES PATENT OFFICE 2,441,699

APPARATUS FOR MOLDING WOOD VENEER

Clarence U. Gramelspacher, Jasper, Ind.

Application November 18, 1942, Serial No. 465,991

3 Claims. (Cl. 144—281)

This invention relates to apparatus for simultaneously forming a plurality of individual sheets of wood veneer, or of very flexible plywood, into articles that are provided with curves of various type in a manner that the article is completely formed and the veneer sheets are bonded together in the mold. The present invention eliminates the necessity for first producing a flat section of plywood and then subsequently steaming and bending the plywood into a desired shape over a suitable form. In a still more particular aspect the present invention relates to apparatus wherein a plurality of individual flexible sheets of veneer are placed without any preforming operations being performed upon the veneer sheets so that when pressure is applied internally within the mold, and thus within the article being formed by the arrangement of the sheets, the forming pressure within the mold will expand the sheets outwardly against the surface of the mold and thus form them to the contour of the mold. During the period of expansion of the individual sheets of veneer, or after they have been expanded into the form of the mold, the mold and the plies of veneer are heated so that an adhesive material provided between adjacent plies of veneer will be activated by the heat to bond the veneer plies together.

One of the principal objects of the invention is to devise an apparatus for forming veneer or flexible plywood sheets by exerting pressure outwardly from within the sheets through means of an expansible membrane to form the sheets to the contour of a mold and to heat the plies of veneer with an extremely high frequency current so that the entire body of the veneer sheets is heated substantially simultaneously.

Another object of the invention is to provide an apparatus for forming wood veneer wherein high frequency current is passed through formed sheets of veneer to heat the same and bond the sheets together, the frequency of the current being in the nature of 2,000,000 cycles per second.

Another object of the invention is to provide an apparatus for forming a plurality of veneer plies and bonding the same together wherein the plies of veneer are placed within a mold and expanded outwardly into engagement with the internal surface of the mold, and heat is applied to the body of the plies by means of a high frequency current that passes through the body between plates positioned adjacent opposite sides of the mold.

Another object of the invention is to provide an apparatus in accordance with the foregoing object wherein one of the plates is positioned outside the article being formed and another of the plates is positioned within the article being formed so that the high frequency current will pass through the article being formed substantially uniformly throughout the entire surface area of the article.

This invention is a continuation in part of my copending application, Serial No. 289,697, filed August 11, 1939, now issued as Patent No. 2,312,332 dated March 2, 1943.

Other objects and advantages will become apparent from the drawings and the following description.

In the drawings:

Fig. 1 is a horizontal cross-sectional view of a mold showing individual sheets of veneer positioned within the mold, the mold being in the process of closing upon the veneer sheets to enclose the same within the mold, the mold walls providing the plates between which a high frequency current is transmitted.

Fig. 2 is a horizontal cross-sectional view similar to Fig. 1 showing the mold in closed position and with an expansible membrane, or rubber bag, inflated and under pressure to form the individual sheets of veneer to the contour of the inner surface of the mold; the veneer sheets being heated by means of a high frequency current passing through the sheets for thermally activating an adhesive agent between the sheets to bond the same together.

Fig. 7 is a perspective view showing individual sheets of veneer, or single laminations with a coating of adhesive on at least one face of each of the sheets, ready for molding. Instead of coating each lamination with adhesive, alternate laminations may be coated on both sides if desired.

Fig. 8 is a perspective view showing individual sheets of plywood that are coated in a manner that they can be assembled for a molding operation.

Fig. 9 is a horizontal cross-sectional view through a mold for a plural sided article, such as a box, and shows the individual sheets of veneer in place in the mold with the outer mold members about to be clamped upon the sheets, and with an expansible membrane, or rubber bag, within the mold in deflated form.

Figure 1:
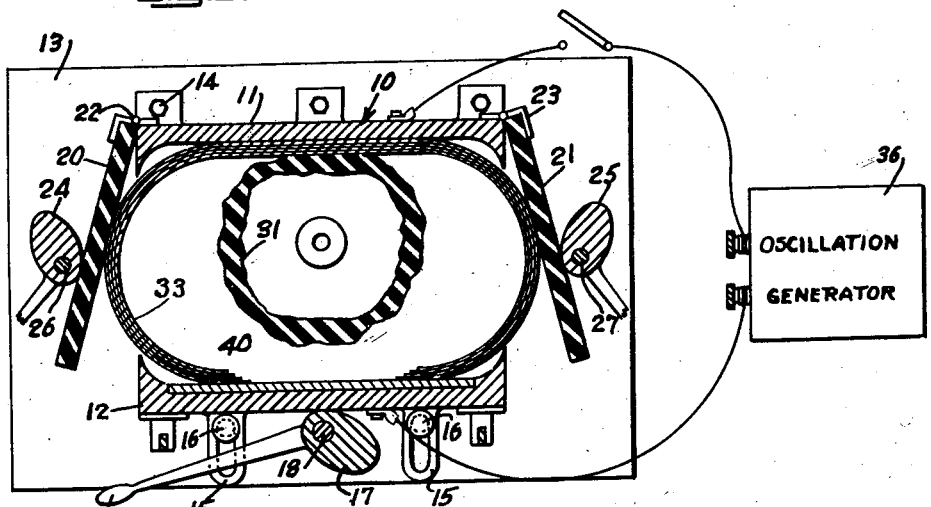

In this invention the apparatus for forming individual veneer plies, and bonding the same together under the application of heat consists of a mold 10. The mold 10 is provided with metal walls 11 and 12 that are spaced from one another in substantial parallel relationship as shown in Figure 1. The wall 11 is secured to the base 13 by means of the bolts 14. The wall 12 is movable upon the base 13 toward and away from the wall 11. The wall 12 has ears 15 that engage studs 16 extending upwardly from the base 13 for guiding the movement of the wall 12 relative to the wall 11. An eccentric 17 is pivoted upon a pin 18 carried on the base 13 for engaging the wall 12 and moving the same toward the wall 11. A handle 19 being provided for rotating the eccentric upon the pin 18.

The side walls of the mold 10 consists of the wall members 20 and 21 that are constructed from an electrical insulating material. These walls members 20 and 21 are hinged upon the wall 11 by means of hinges 22 and 23 respectively, so that the wall members 20 and 21 can be opened to permit the insertion of the sheets of veneer within the mold 10. The eccentric members 24 and 25 are pivoted upon the pins 26 and 27 respectively, and are adapted to engage the wall members 20 and 21 to close the end walls of the mold 10, and to lock the walls 20 and 21 in closed position.

The top wall 28 for the mold 10 is hinged upon the wall 11 by means of the hinge 29. A latch 30 is provided adjacent the wall 12 of the mold for locking the top wall 28 upon the upper edges of the vertical walls of the mold 10 to thereby provide an enclosed space within the mold when the walls are all closed into adjacent relationship. The base 13 provides the bottom wall of the mold 10, and is constructed of an electrical insulating material, the top wall 28 being also constructed from an electrical insulating material.

An expansible membrane, or rubber bag 31, is positioned within the mold 10, a fluid supply pipe 32 being secured to the membrane 31 for supplying a fluid under pressure to the interior of the membrane 31. The fluid used to expand the rubber bag 31 may be any suitable fluid under pressure such as a gas or a liquid, or a volatile substance can be admitted to the bag 31 that will produce pressure when it is heated and thereby expand the membrane or bag 31.

As thus far described, the mold 10 is adapted to receive a plurality of individual veneer plies that may be formed into a plural sided article 33, such as a box. The article 33 is adapted to be constructed from a plurality of individual veneer plies 40, see Fig. 7. These plies are coated on one or both sides with an adhesive material 34 which may be any of the satisfactory materials that can be used for bonding veneer plies of various types. If the veneer plies are wood, the urea resins form satisfactory bonding agents that provide permanency of bond between the veneer plies. The bonding agent 34 can be applied upon the veneer plies 40 either in a liquid form or in a dry sheet form. In either instance the material is activated when heat is applied to the material so that the veneer sheets will bond together when they are placed under pressure and heat is applied thereto. If desired the individual plies that are used to construct the article 33 may be in the form of thin sheets of plywood 41, see Fig. 8. In this instance, of course, the plywood sheets are extremely flexible, and preferably should be relatively thin to increase the flexibility of the sheets. In this instance, the plywood sheets 41 will be provided with an adhesive material 35 in the same manner as heretofore described with respect to the individual veneer plies 40.

In order to position a plurality of individual wood veneer plies within the mold 10, the side walls 20 and 21, the top wall 28 and the front wall 12 are moved relative to the rear wall 11 to open the sides and top of the mold, and to increase the space between the front wall 12 and the rear wall 11 so that the size of the mold is substantially increased. The individual wood veneer plies are then inserted within the mold 10 in adjacent relationship so that the sheets of veneer that have adhesive thereon are disposed adjacent, or between, other sheets of veneer. It is, of course, understood that if a complicated form such as four or five sides of a box are to be formed within the mold 10 that the sheets of veneer will be precut so that when they are bent toward their final position that the edges of the sheets of plywood will be brought into abutting relationship, or the sheets of plywood can consist of strips that are positioned in adjacent relationship in layers to produce a plurality of plies. It is also understood that under such conditions that adjacent plies of the sheets of wood can have the grain of the wood running angularly with respect to each other in the normal and conventional manner of producing plywood structures, and that the sheets of veneer can be arranged so that adjacent sheets are disposed in a prearranged manner so that the joints between abutting edges of one sheet of veneer is closed by a face of an adjacent sheet of veneer, whereby a solid structure is obtained.

With the sheets of veneer 40 positioned within the mold 10, the ends of the sheets are tucked within the mold 10, as shown in Fig. 1. It is not essential that the sheets of veneer 40 shall be arranged within the mold in the exact position that they will be disposed in the finished article because the subsequent steps of the process, to be hereinafter described preferably produces the final arrangement of the sheets relative to one another. The front wall 12 is then moved toward the rear wall 11 and the end walls 20 and 21 are closed upon the front wall 12. The top wall 28 then being brought into engagement with the vertical walls so that the veneer sheets 40 are confined within a rectangular shaped mold. When the walls of the mold are closed they, of course, urge the veneer sheets into the mold and toward their final position. However, if the mold walls are provided with curved surfaces, or compound curves are provided on the mold surfaces, the veneer sheets 40 will not be in engagement with the entire surface of the mold provided by the various walls thereof. In some cases the veneer sheets will stand a substantial distance from the mold walls according to the complexity of the article being formed, in other cases the veneer sheets will be in substantial engagement with the entire surface of the mold.

Fluid under pressure is then admitted into the rubber bag or membrane 31 to expand the same. When this membrane, or bag, 31 expands due to the application of pressure therein, it will ultimately engage the innermost sheet of veneer 40. A continued application of pressure within the bag 31 will then produce pressure upon the various sheets of veneer 40 to cause them to expand outwardly into engagement with the inner surface of the mold 10. In the process of expanding the veneer sheets outwardly, they will shift relative to one another so that they can conform to the curvature, or surface configuration, of the inner surface of the mold. Also, in producing a shifting of the veneer sheets relative to one another during the expansion of the sheets, they will move into their final position relative to one another. With pressure applied within the membrane 31 the adhesive can then be set by applying heat upon the veneer sheets.

In order to heat the veneer sheets this invention uses a high frequency current that is passed through the veneer sheets 40. It has previously been mentioned that the rear wall 11 and the front wall 12 are metal plates. These metal plates are connected to a high frequency oscillation generator 36, one of the plates 11 forming a positive plate and the other plate 12 forming a negative plate. There is no direct connection between the plates 11 and 12 except through the wood veneer sheets 40, the walls 20, 21, 13 and 23 all being constructed of electrical insulating material that has a high dielectric strength so that there will be substantially no passage of current through these walls. The oscillation generator 36 is of a type that is adapted to produce a relatively high voltage which is preferably a direct current. This current is then converted to radio-frequency current at approximately 2,000,000 cycles per second by means of suitable mercury vapor amplifier tubes that have a relatively large capacity.

It is well-known that all wood has a certain percentage of moisture content, and the adhesive used between the plies of this invention will also have some moisture content if the adhesive is used in a liquid form. Under such conditions there will be dielectric loss through the wood, the wood itself forming the dielectric that is distorted repeatedly at a high frequency which produces molecular friction within the sheets of wood veneer that releases heat throughout the entire mass of the dielectric. Since the high frequency current is transmitted throughout the entire body of each of the sheets of veneer the heat produced is evenly distributed and therefore brings about a rapid heating and setting of the adhesive between the veneer sheets, the rate of heating being nearly in direct proportion to the volume of plywood being handled. This form of heating of the plywood, therefore produces a much more rapid setting of the adhesive than other forms of heat which can be applied to the external surfaces of the plurality of veneer sheets when in adjacent relationship within the mold. The even distribution of heat throughout the entire mass of the veneer sheets produces a more satisfactory bond between all of the sheets because substantially the same temperature exists throughout the entire mass of the plywood article.

The high frequency current will be maintained upon the article 33 to produce satisfactory setting of the adhesive, this being accomplished usually within a period of about five or six minutes. The temperatures involved to produce setting of the adhesive, of course, depend upon the nature of the adhesive, that is temperatures vary anywhere from 160° to about 300°, it being necessary, of course, to stay below the charring temperature of the veneer sheets 40, a satisfactory bond being obtained at about 250° with an urea resin.

After the adhesive has set the pressure is released from the expansible bag or membrane 31 to deflate the same. The mold is then opened and the article removed from the mold in a completely formed condition. Since the outermost sheets of veneer engage the walls of the mold the surface of the article will be smooth and uniform, and all irregularities caused by varying thickness of the veneer plies will be present on the inside surface of the article. Therefore, the outer surface of the article requires a very minimum of finishing after the article is removed from the mold.

Figure 3:
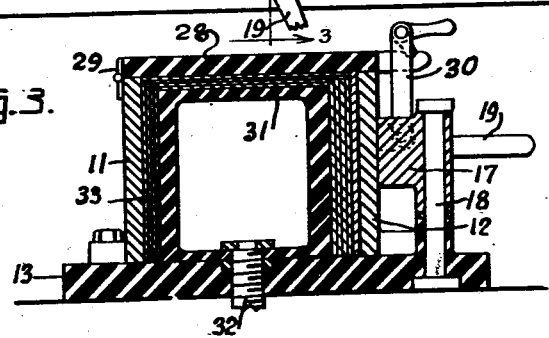
Fig. 3 is a vertical cross-sectional view taken along line 3—3 of Fig. 2.
Figure 4:
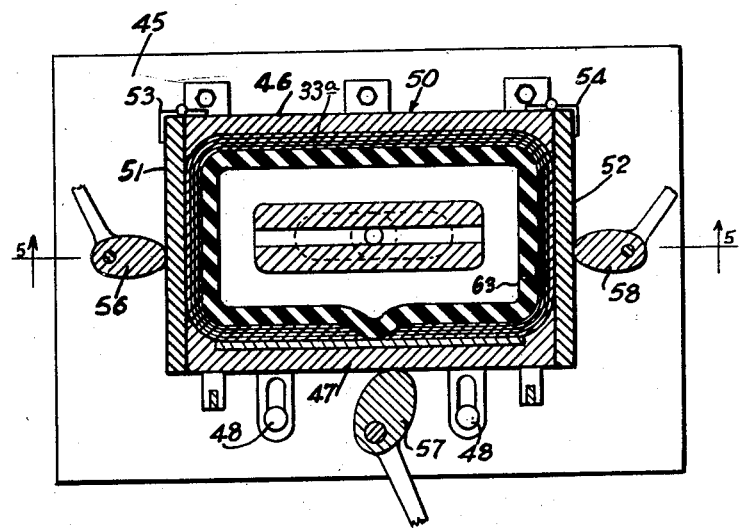
Fig. 4 is a horizontal cross-sectional view of a slightly modified form of mold arrangement wherein one of the plates for transmitting a high frequency current is positioned within the mold, and the walls of the mold provide the other plate that is disposed around the article being formed from the veneer sheets.
Figure 5:
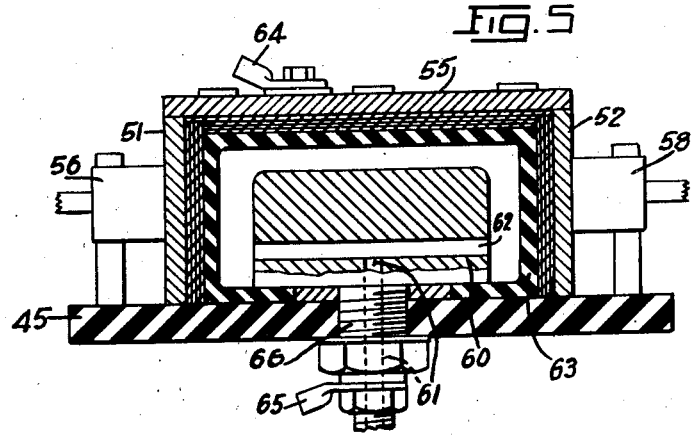
Fig. 5 is a vertical cross-sectional view taken along line 5—5 of Fig. 4.

In Figs. 4 and 5 there is shown a slightly modified arrangement of an apparatus for heating the veneer plies by the use of high frequency current. In this arrangement the mold consists of a base 45 to which a wall 46 is secured. A front wall 47 for the mold 50 is movable relative to the wall 46 upon the guiding pins 48. The mold side walls 51 and 52 are hinged upon the rear wall 46 by means of hinges 53 and 54. A top wall 55 is adapted to close upon the side walls 51 and 52 to thereby provide an enclosure having a predetermined configuration for producing an article of a certain shape. The walls 46, 47, 51, 52 and 55 are all constructed from metal and can therefore provide one of the plates receiving the high frequency current from an oscillation generator. These walls are movable relative to one another in the same manner as described in regard to Fig. 1, the mold walls being locked in place by means of the cam members 56, 57 and 58. The top wall 55 is provided with a latching device similar to that disclosed in regard to Figs. 1 to 3.

The second plate for receiving high frequency current consists of a metal member 60 that is disposed within the mold 50. This metal member 60 is provided with a passageway 61 that communicates with a passageway 62 for admitting fluid under pressure within the expansible bag or membrane 63 that is placed within the mold 50. An electrical connection 64 is secured to the top wall 55 and provides means for connecting the walls 46, 47, 51, 52 and 55 with one side of an oscillation generator for producing high frequency current. A similar electrical connection 65 is provided on the shank 66 of the member 60 that extends through the base 45.

Figure 2:
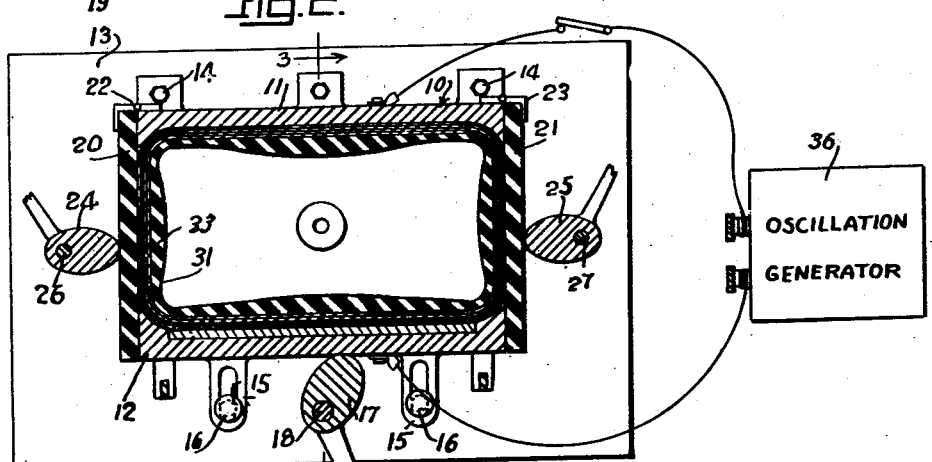

The operation of the device disclosed in Figs. 4 and 5 is the same as that heretofore described with regard to the apparatus shown in Figs. 1 to 3. The arrangement of Figs. 4 and 5 has an advantage in that the flow of high frequency current through the veneer article 33a is substantially uniform throughout the entire area of the article 33a, whereby the body of the article 33a is heated substantially uniformly throughout the entire body of the article since each sheet of veneer receives substantially the same quantity of high frequency current throughout its entire body.

Figure 6:
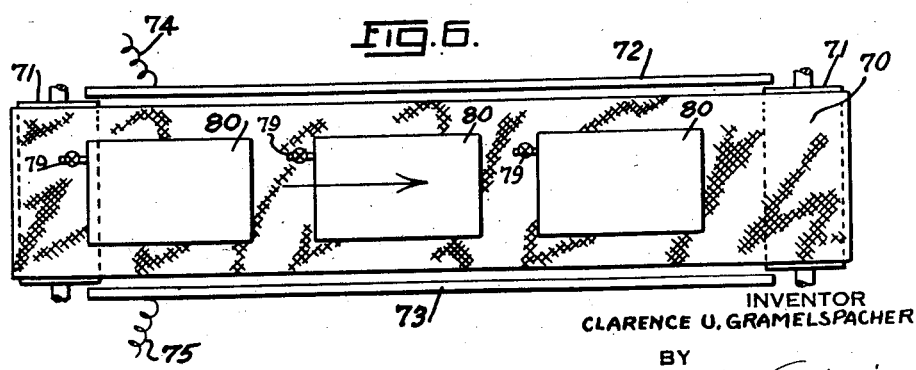
Fig. 6 is a diagrammatic plan view of an apparatus for producing a continuous process in forming wood veneer sheets wherein the molds having the sheets expanded against the inner walls thereof are placed between high frequency plates for heating the veneer plies and causing the adhesive to bond the plies together.

In Fig. 6 there is shown an apparatus, somewhat diagrammatically for providing a continuous operation when producing molded veneer articles, and heating the same by means of high frequency current to set the adhesive between the plies of veneer. In the apparatus disclosed in this figure a belt 70 is positioned between a pair of rollers 71, one of which is driven by a suitable source of power, for advancing the belt between the plates 72 and 73. The plates 72 and 73 may be disposed adjacent the edges of the belt 70 and positioned at right angles to the belt so that a chamber is provided between the plates 72 and 73 which is traversed by high frequency current when the current is applied upon the plates. Suitable electrical connections 74 and 75 are provided for the plates 72 and 73 for connecting them to a source of high frequency current, such as a suitable oscillation generator.

The molds 80 are completely independent units and are adapted to be placed upon the belt 70 to pass between the plates 72 and 73. The outer walls of these molds 80 are preferably constructed from a material that will not effect the passage of high frequency current to the article being formed, and heated, within the molds 80. The molds are provided with an expansible membrane in the same manner as heretofore described that is adapted to be expanded against the veneer sheets placed within the mold to thereby form them to the contour of the interior surface of the molds. To supply fluid under pressure to the expansible bags or membrance, within the molds 80, valves 79 are provided on each of the molds 80. The valves can be connected to a suitable source of pressure fluid to permit filling of the expansible membranes within the molds 80, and when the membranes have been filled and placed under the desired pressure, the valves 79 will be closed to thereby seal the pressure within the expansible membranes placed within the molds 80.

The molds 80 are thus individual units that can be passed between the plates 72 and 73 so that the field of high frequency current provided between the plates will pass through the molds, and the veneer sheets placed therein to heat the mold and the veneer sheets and thus set the adhesive provided between the veneer sheets to bond the same together.

When the molds 80 have completed their travel between the plates 72 and 73 they are removed from the belt 70 and placed to one side until the molds and the veneer sheets therein have cooled to a temperature at which it will be permissible to release the pressure from the expansible membrane within the molds 80. After the pressure is released from within the molds 80 they can be opened and the completely formed article removed therefrom.

A veneer molding process, of which this application is a continuation in part, has previously been disclosed in the copending application, Serial No. 289,697, filed August 11, 1939, now issued as Patent No. 2,312,332 dated March 2, 1943, which consists of a mold 85 having a base 86 supporting a rear wall 87. A front wall 88 is movable relative to the rear wall 87, and side walls 89 are hinged to the rear wall 87 by the hinges 90, whereby an enclosure is provided when the top wall provided for the mold is closed upon the side wall. This mold 85 is operated in the same manner as the mold described with regard to Figs. 1 to 3 for confining plies of veneer 40b within the mold. An expansible membrane or bag 91 is provided within the mold 85 and receives fluid under pressure through the conduit passage 92, this same conduit passage providing for exhaust of fluid from the expansible bag 91 when deflating the bag.

The mold 85 is closed upon the veneer plies 40b in the same manner as heretofore described with regard to Figs. 1 to 5, inclusive, and the expansible membrane 91 is filled with fluid under pressure to expand the veneer plies 40b into engagement with the inner surface of the mold 85.

The mold 85, and the plies of veneer therein, are heated by means of steam that is circulated through passages 93 provided within the walls of the mold 85, a suitable valve 94 controlling the flow of steam through the passages 93. The plies of veneer 40b have of course received adhesive on one or both sides thereof before being placed in the mold 85 so that when the mold is heated by means of the passage of steam therethrough the plies of veneer, and the adhesive, will be heated to a suitable temperature to cause the adhesive to set and thereby bond the plies of veneer together.

After the heat has been retained upon the mold 85 a sufficient length of time, approximately fifteen minutes, to thereby cause the adhesive to set, the mold will be cooled by stopping the flow of steam, or by circulating a cooling fluid through the passages 93 to thereby reduce the temperature of the veneer plies and the adhesive to prevent the same from moving relative to one another before the pressure is released from the expansible member 91.

After the temperature of the mold 85 and the veneer article 95 therein has been reduced sufficiently, the mold will be opened and the article 95 removed therefrom.

While the apparatus disclosed and described herein constitutes a preferred form of the invention, yet it is to be understood that the apparatus covers substantial alterations therein without departing from the spirit of the invention, and that all such modifications as fall within the scope of the appended claims are intended to be included therein.

Having thus fully described my invention what I claim as new and desire to secure by Letters Patent is:

1. An apparatus for forming a plurality of individual sheets of wood veneer into a finished article having a predetermined configuration consisting of, a mold having a plurality of individual walls defining a cavity having said configuration, at least some of said walls being electrically conductive, means electrically insulating said conductive walls from the others thereof, means for connecting a source of high frequency electrical energy to said conductive walls whereby they act as electrodes to establish a field of high frequency energy within said cavity, and a flexible membrane positioned within said cavity and expansible to force sheets of veneer in the cavity outwardly against said individual walls.

2. An apparatus for forming a plurality of individual flexible sheets of wood veneer into a finished article having a predetermined configuration that includes, a plurality of wall means associated to define a cavity having said configuration, alternate walls of said wall means being of electrical insulating material and the others thereof being electrically conductive, a source of high frequency electrical energy connected with the others of said walls whereby they act as electrodes to establish a field of high frequency energy within said cavity, and a flexible membrane within said cavity expansible toward said walls to carry the flexible sheets of wood veneer into forming engagement therewith.

3. An apparatus for forming a plurality of individual flexible sheets of wood veneer into a finished article comprising, a mold having a plurality of individual walls operatively associated to define a mold cavity having the configuration of the finished work piece, some of said walls being electrically conductive and insulated from the others of said walls and from each other, a source of high frequency electrical energy connected with said some of said walls whereby they act as electrodes to establish a field of high frequency energy in said cavity, and a flexible membrane within said cavity expansible by fluid pressure for moving sheets of wood veneer into forming relationship with the surface of said cavity.

CLARENCE U. GRAMELSPACHER.

REFERENCES CITED

The following references are of record in the file of this patent:

UNITED STATES PATENTS

| Number | Name | Date |
|---|---|---|
| 1,381,179 | Gerson | June 14, 1921 |
| 1,428,469 | Bolger | Sept. 5, 1922 |
| 2,109,323 | Smith | Feb. 22, 1938 |
| 2,183,599 | Welch | Dec. 19, 1939 |
| 2,231,457 | Stephen | Feb. 11, 1941 |
| 2,276,004 | Vidal et al. | Mar. 10, 1942 |
| 2,288,269 | Crandell | June 30, 1942 |
| 2,312,332 | Gramelspacher | Mar. 2, 1943 |

FOREIGN PATENTS

| Number | Country | Date |
|---|---|---|
| 444,462 | Great Britain | Mar. 20, 1936 |